United States Patent
Yoon

(10) Patent No.: US 9,285,990 B2
(45) Date of Patent: Mar. 15, 2016

(54) SYSTEM AND METHOD FOR DISPLAYING KEYPAD VIA VARIOUS TYPES OF GESTURES

(71) Applicant: Samsung Electronics Co. Ltd., Suwon-si, Gyeonggi-do (KR)

(72) Inventor: Sungjin Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 121 days.

(21) Appl. No.: 13/936,610

(22) Filed: Jul. 8, 2013

(65) Prior Publication Data
US 2014/0022179 A1    Jan. 23, 2014

(30) Foreign Application Priority Data

Jul. 17, 2012    (KR) .................. 10-2012-0077662

(51) Int. Cl.
*G06F 3/048*    (2013.01)
*G06F 3/0488*    (2013.01)

(52) U.S. Cl.
CPC .................................. *G06F 3/04886* (2013.01)

(58) Field of Classification Search
CPC .............. G06F 3/048–3/04812; G06F 3/0482; G06F 3/0484; G06F 3/04845; G06F 3/0487–3/04886

USPC .................. 345/168, 169, 173–177; 715/863
See application file for complete search history.

(56) References Cited

U.S. PATENT DOCUMENTS

| | | | |
|---|---|---|---|
| 2007/0220444 A1* | 9/2007 | Sunday et al. ................ | 715/788 |
| 2009/0237359 A1 | 9/2009 | Kim et al. | |
| 2010/0013780 A1* | 1/2010 | Ikeda et al. .................. | 345/173 |
| 2010/0141590 A1 | 6/2010 | Markiewicz et al. | |
| 2010/0156793 A1* | 6/2010 | Ozias et al. .................. | 345/168 |
| 2011/0090164 A1* | 4/2011 | Park et al. .................... | 345/173 |
| 2013/0057475 A1* | 3/2013 | Duggan et al. ............... | 345/168 |

FOREIGN PATENT DOCUMENTS

KR    10-2011-0119341 A    11/2011

* cited by examiner

*Primary Examiner* — Nathan Danielsen
(74) *Attorney, Agent, or Firm* — Jefferson IP Law, LLP

(57) ABSTRACT

A system and method of receiving various types of gestures and displays corresponding keypads on the mobile device are provided. The method includes receiving a keypad calling command, and arranging and displaying one or more keypad blocks on the screen of the mobile device, according to a track of the keypad calling command. The keypad display system includes an input unit for receiving a user's input, and a controller for determining whether the user's input is a keypad calling command, and for arranging and displaying one or more keypad blocks on the screen, according to a track of the keypad calling command.

25 Claims, 17 Drawing Sheets

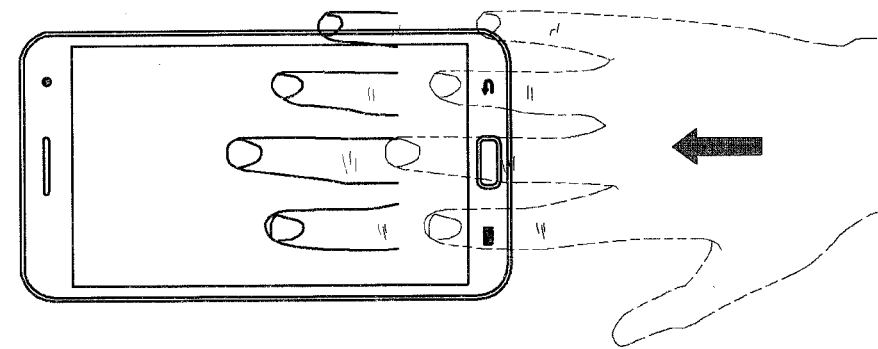
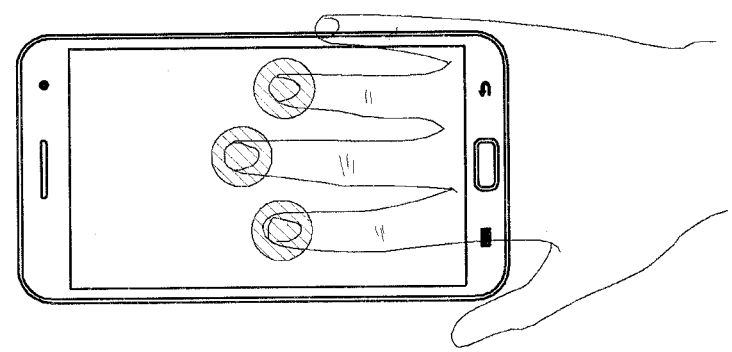
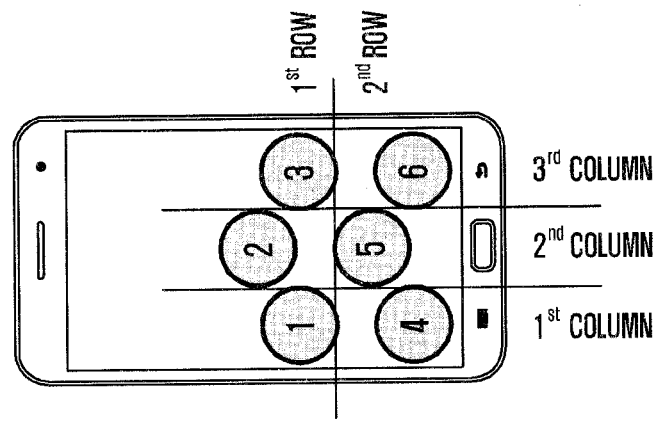
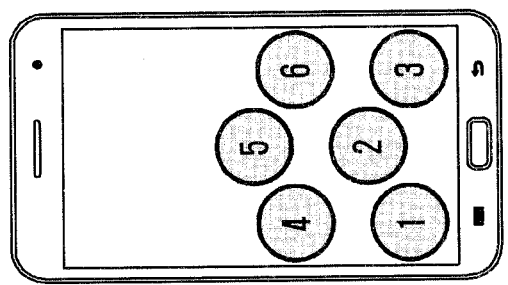

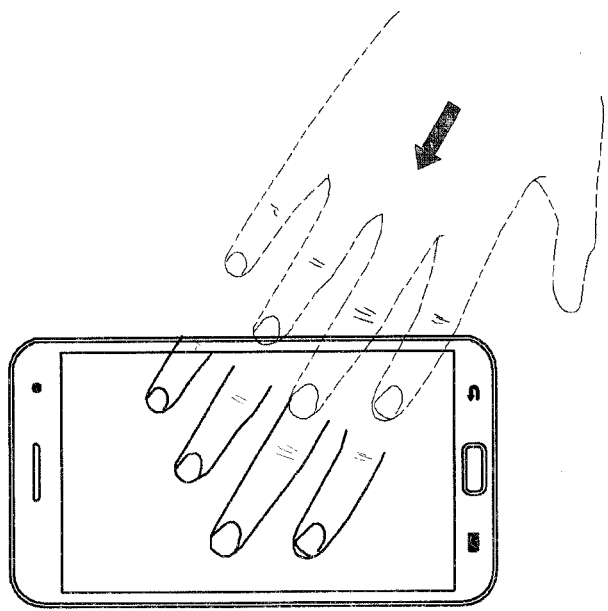
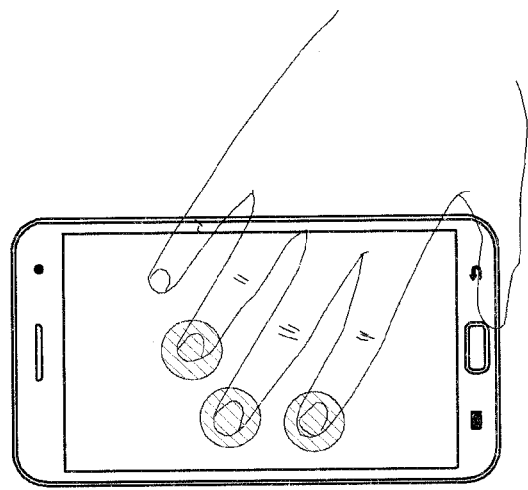
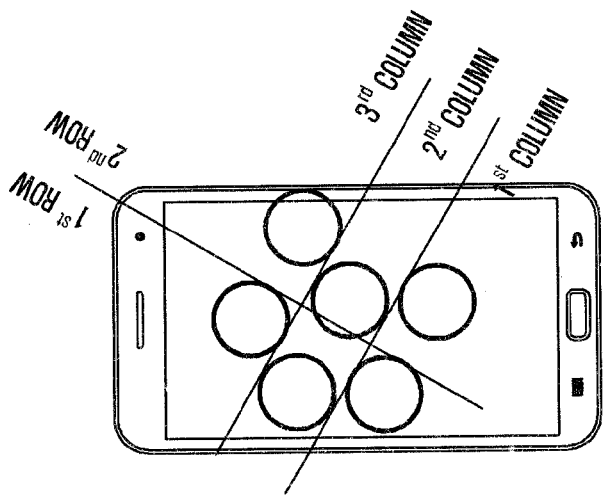

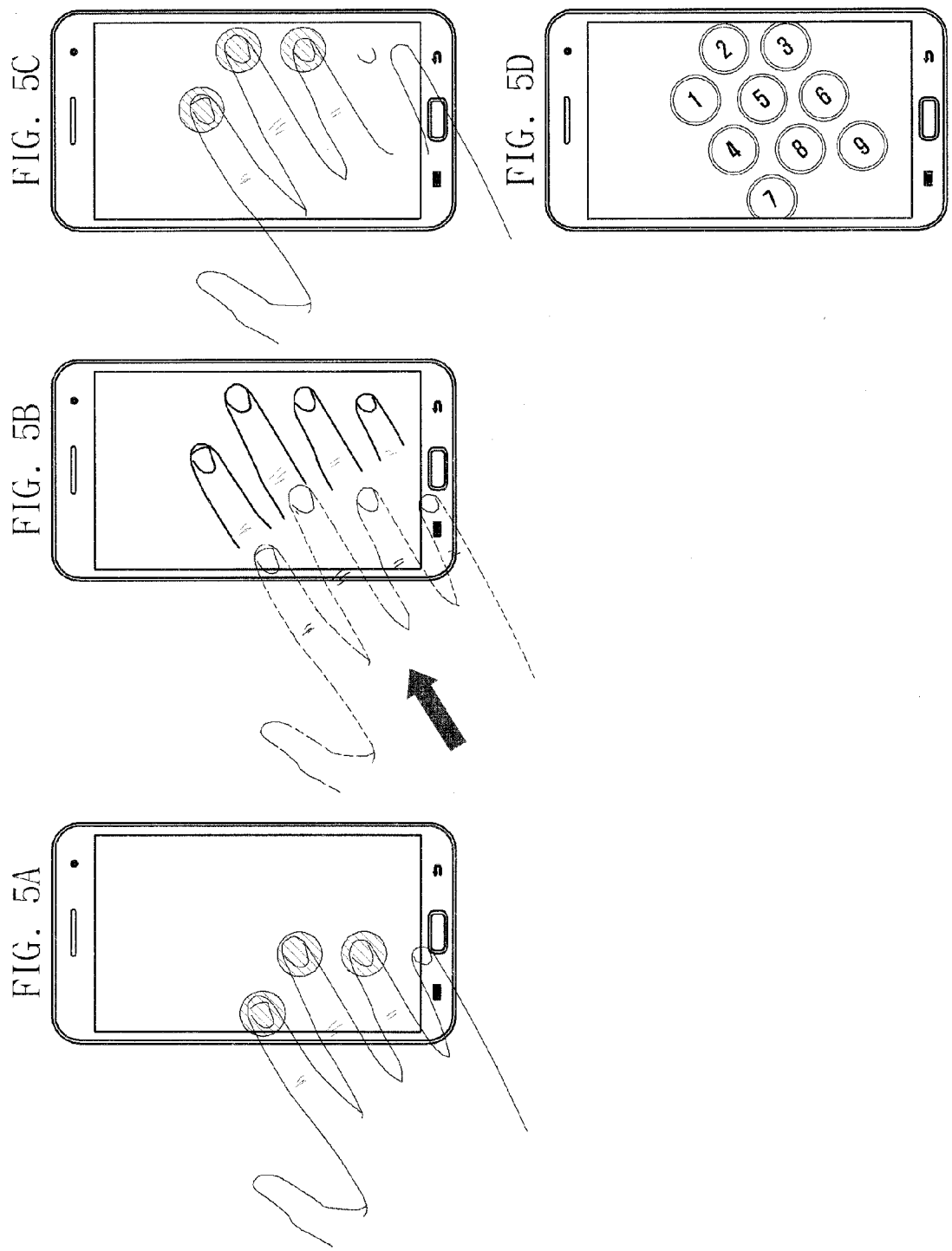

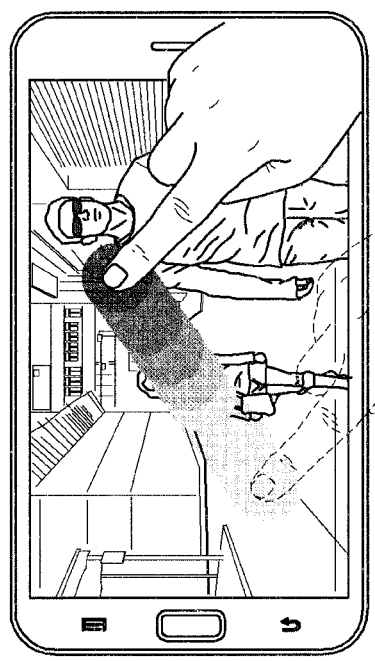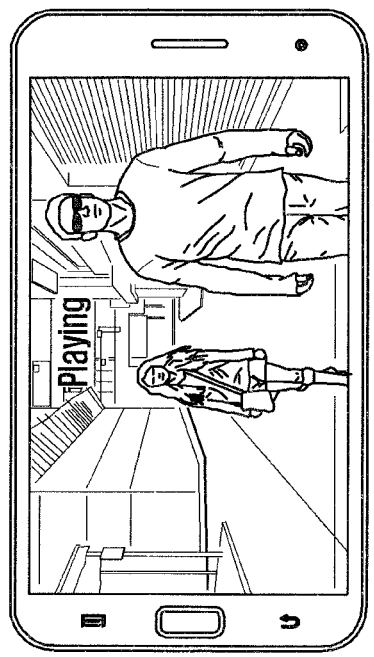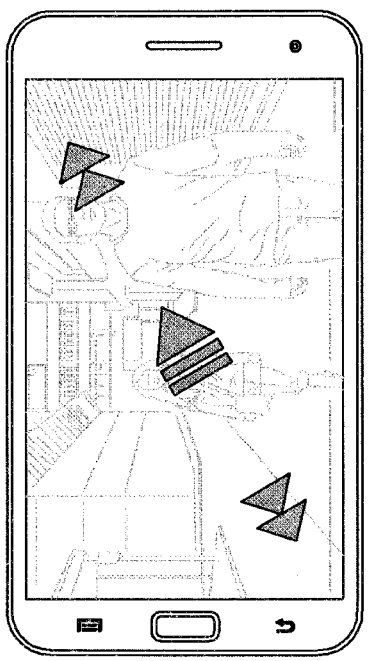

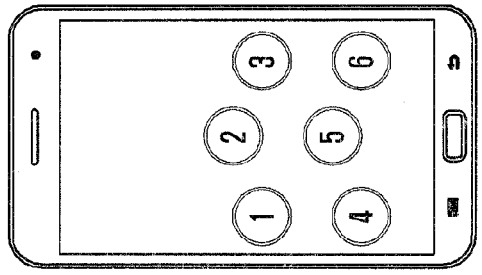
FIG. 15A
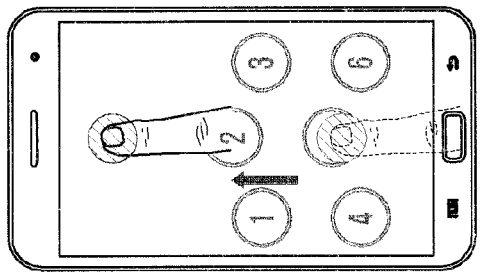
FIG. 15B
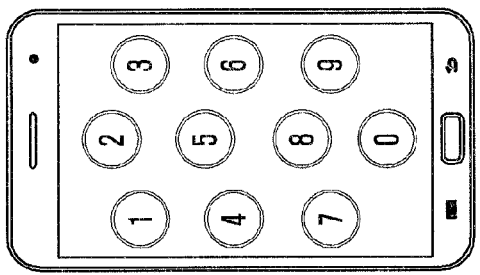
FIG. 15C
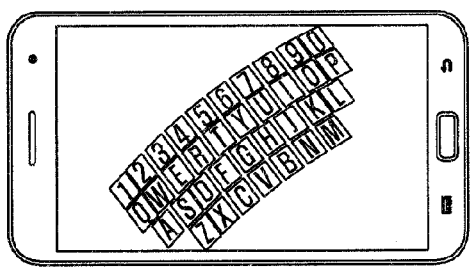
FIG. 15F
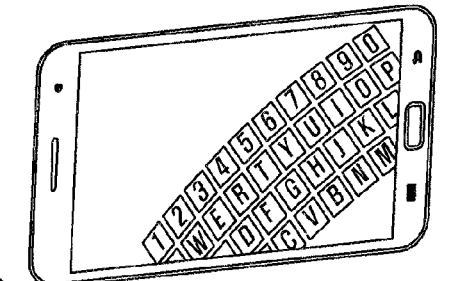
FIG. 15E
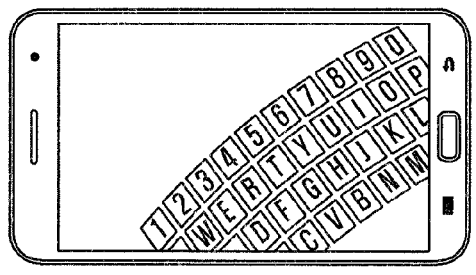
FIG. 15D

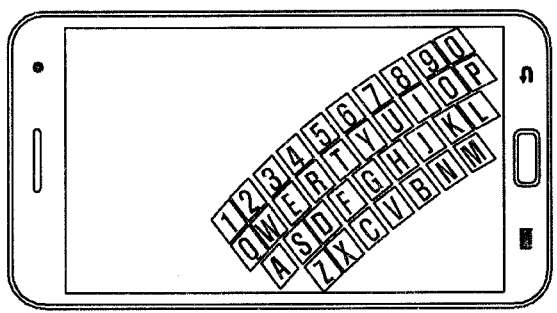
FIG. 16C
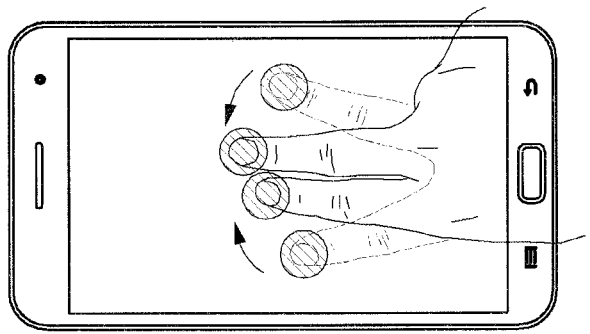
FIG. 16B
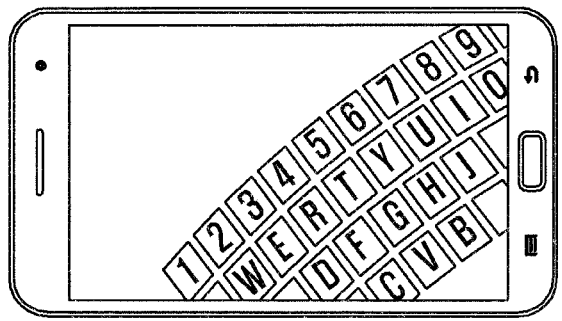
FIG. 16A

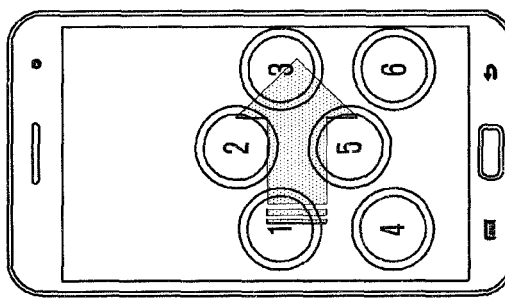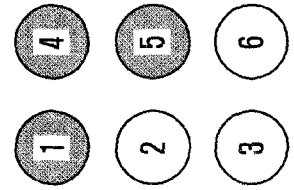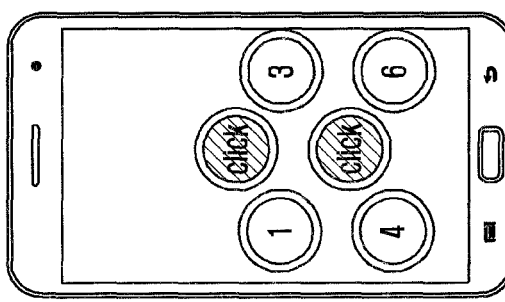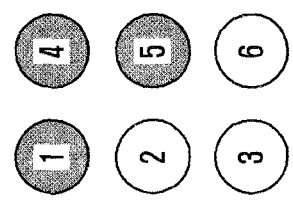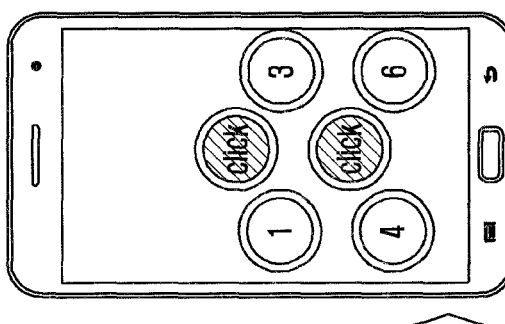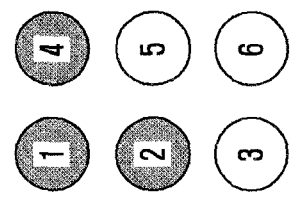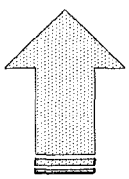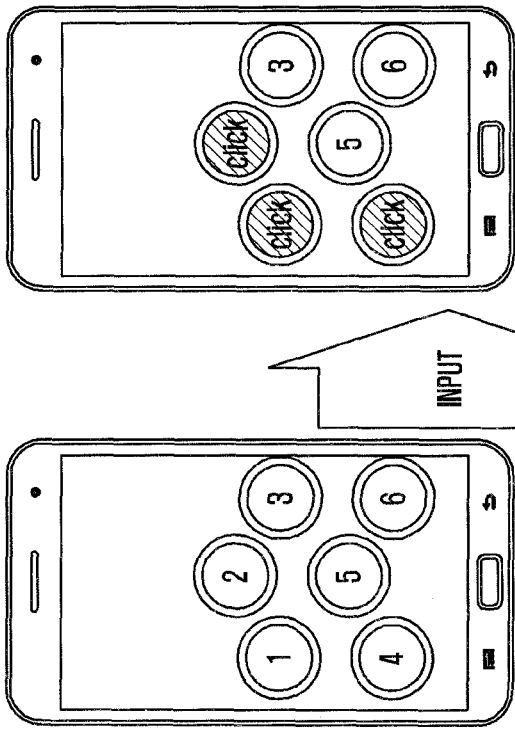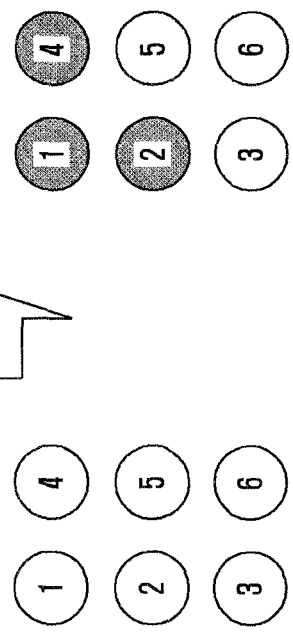

SYSTEM AND METHOD FOR DISPLAYING KEYPAD VIA VARIOUS TYPES OF GESTURES

PRIORITY

This application claims the benefit under 35 U.S.C. §119(a) of a Korean patent application filed on Jul. 17, 2012 in the Korean Intellectual Property Office and assigned Serial No. 10-2012-0077662, the entire disclosure of which is hereby incorporated by reference.

BACKGROUND OF THE INVENTION

1. Field of the Invention

The present invention relates to a system and method that receives various types of user gestures as a keypad calling command and displays a keypad. More particularly, the present invention relates to a system and method that sets types of keypads according to a number of drag gestures that are input, sets a location to display a keypad according to the track of the gesture, and displays the keypad.

2. Description of the Related Art

Keypads according to the related art are configured in a preset format and displayed in a fixed location on a touch screen according to user interfaces. Such keypads are displayed irrespective of ergonomic designs, without considering the user's preferences or conditions.

If keypad blocks are displayed in fixed locations on a screen, users cannot recognize the displayed keypad without corresponding visual information. It is difficult for visually impaired people, who aren't able to use visual information, to use the keypads according to the related art.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems, and/or disadvantages and to provide at least the advantages described below. Accordingly, an aspect of the present invention is to provide a system and method that configures and displays a keypad including icons, numbers, letters, special characters, etc. according to the number of drag gestures for a keypad calling command, thereby increasing the intuitiveness of the user interface for displaying the keypad.

Another aspect of the present invention is to provide a system and method that arranges keypad blocks according to the track of a keypad calling command, thereby providing an ergonomic keypad considering a user's preferences and conditions.

Another aspect of the present invention is to provide a system and method that allows users to easily adjust a keypad on a touch screen, in location and scale.

Another aspect of the present invention is to provide an interface that flexibly displays keypad blocks according to the track of a keypad calling command, so that visually impaired people can easily use the mobile device employing the interface.

In accordance with an aspect of the present invention, a method for displaying a keypad on a mobile device is provided. The method includes receiving a keypad calling command, and arranging and displaying one or more keypad blocks on the screen of the mobile device, according to a track of the keypad calling command.

In accordance with another aspect of the present invention, a system for displaying a keypad on a mobile device is provided. The system includes an input unit for receiving a user's input, and a controller for determining whether the user's input is a keypad calling command, and for arranging and displaying one or more keypad blocks on the screen, according to a track of the keypad calling command.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIGS. 2A to 2D illustrate screens describing a type of interface for displaying keypads according to an exemplary embodiment of the present invention;

FIGS. 3A to 3C illustrate screens describing another type of interface for displaying keypads according to an exemplary embodiment of the present invention;

FIGS. 5A to 5D illustrate screens describing a method for executing a keypad calling command according to an exemplary embodiment of the present invention;

FIGS. 8A to 8C illustrate screens describing a method for displaying an icon keypad according to an exemplary embodiment of the present invention;

FIGS. 15A to 15F illustrate screens describing a method for moving a keypad that is displayed according to an exemplary embodiment of the present invention;

FIGS. 16A to 16C illustrate screens describing a method for adjusting the scale of a keypad that is displayed according to an exemplary embodiment of the present invention; and FIGS. 17A to 17D illustrate screens describing a method for using a keypad display interface by visually impaired people, according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, mobile devices refer to information processing systems that can process data that is received/will be transmitted from/to the external systems. Mobile devices can display the stored data or icons mapped to functions that are executed therein. It will be appreciated that exemplary embodiments of the present invention can be applied to all information communication devices, multimedia devices, and their applications, e.g., computers, laptop computers, tablet PCs, smart phones, mobile phones, and the like.

A keypad refers to a keypad set that includes a set of keypad blocks serving as components. A number of keypad blocks forms one keypad set, or a keypad. A keypad may also be considered as a group of keypad sets.

Icons refer to images or symbols representing applications, folders, data, and the like displayed on the screen of mobile devices, and are used to execute the corresponding functions when they are selected. The icons can be created in various shapes, colors, or a combination thereof.

Letter blocks refer to blocks presenting English letters, Korean characters, Chinese characters, Japanese characters, numbers, special characters, and the like. It should be understood that the letter blocks are not limited to the letters or characters listed above but may include a variety of letters or characters other than the listed characters or letters.

Figure 1:
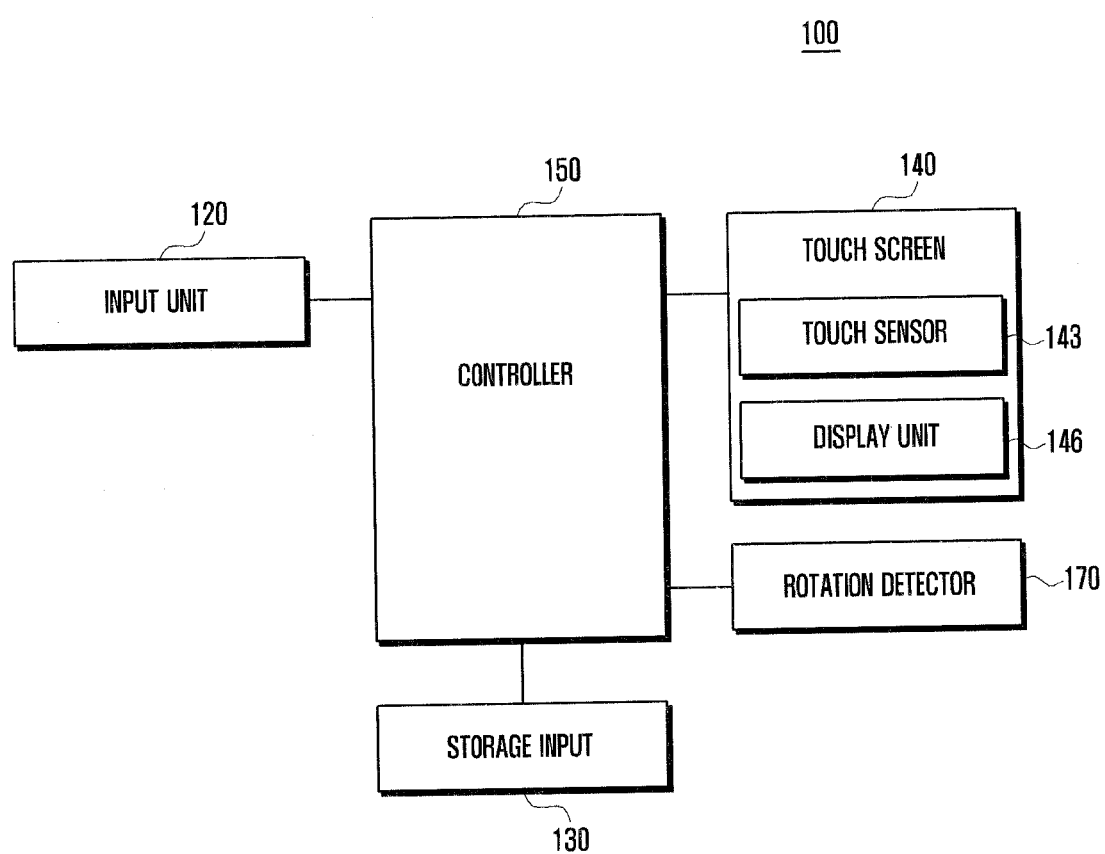
FIG. 1 illustrates a configuration of a keypad display system according to an exemplary embodiment of the present invention.

FIG. 1 illustrates a configuration of a keypad display system or a mobile device according to an exemplary embodiment of the present invention.

Referring to FIG. 1, the mobile device 100 includes an input unit 120, a storage input 130, a touch screen 140, a controller 150, and a rotation detector 170.

The input unit 120 receives user input, creates signals for controlling the mobile device 100, and transfers the signals to the controller 150. The input unit 120 may be implemented with a keypad including numeric keys, direction keys, and the like. The input unit 120 may also include function keys on a side of the mobile device 100. The mobile device 100 may be designed to be controlled only via the touch screen 140. In that case, the touch screen 140 serves as the input unit 120.

The storage input 130 stores data and programs required to operate the mobile device 100. The storage unit 130 includes a program storage area and a data storage area.

The program storage area stores an Operating System (OS) for booting the mobile device 100 and controlling the operation of the mobile device 100, and application programs that may be necessary for other functions of the mobile device 100, such as a camera function, an audio playback function, an image or video playback function, and the like. The data storage area stores data that is created when the mobile device 100 is used, for example, images, videos, a phone book, and audio data.

The touch screen 140 includes a touch sensor 143 and a display unit 146.

The touch sensor 143 detects a user's input touches. The touch sensor 143 may be implemented with various types of touch sensors, including a capacitive overlay type sensor, a resistive overlay type sensor, an infrared beam type sensor, a pressure sensor, and the like. It should be understood that exemplary embodiments of the present invention are not limited to the sensors listed above. The touch sensor 143 can be implemented with all types of sensors capable of detecting touch, contact, or pressure. The touch sensor 143 detects a user's input touches, creates the touch signals, and transfers the signals to the controller 150. The touch signals include coordinates of the touches. If the user moves the touch, the touch sensor 143 detects the moving touch, creates the detected signals including the coordinates according to the movement paths of the touches, and transfers the signals to the controller 150. The touch sensor 143 can also detect a user's input for calling or adjusting a keypad.

The display unit 146 may be implemented with a Liquid Crystal Display (LCD), an Organic Light Emitting Diode (OLED), an Active Matrix Organic Light Emitting Diodes (AMOLED), or the like. The display unit 146 displays menus, input data, function-setting information, and additional information. The display unit 146 also displays keypads according to an exemplary embodiment of the present invention.

The rotation detector 170 detects the rotation or tilt of the mobile device 100, and transfers the corresponding signal to the controller 150. The rotation detector 170 may be implemented with a gyro sensor, an acceleration sensor, and the like. The rotation detector 170 detects a keypad adjusting command for moving a keypad that is displayed. If the rotation detector 170 detects a tilt of the mobile device 100 that displays a keypad on the screen, and transfers the detected tilt signal to the controller 150, the controller 150 determines the signal as a command to move the keypad.

The controller 150 controls the entire operation of the components in the mobile device 100. The controller 150 determines whether a user's input is a keypad calling command. The controller 150 also arranges and displays keypad blocks according to the direction of a drag gesture or a location where a touch is removed, etc.

The controller 150 configures keypad blocks, including icons, numbers, letters or special characters, etc., in various types according to the number of drag gestures that are input. For example, if the controller 150 detects one drag gesture that has occurred on the screen, the controller 150 may configure keypad blocks with only icons. If the controller 150 detects three drag gestures that have occurred on the screen, the controller 150 may configure keypad blocks with only numbers. If the controller 150 detects five drag gestures that have occurred on the screen, the controller 150 may configure keypad blocks with numbers and letters. If the controller 150 detects ten drag gestures that have occurred on the screen, the controller 150 may configure keypad blocks with numbers, letters, and special characters. The methods for configuring keypad blocks according to the number of drag gestures are described below referring to the accompanying drawings.

The controller 150 receives a user's input for calling a keypad, and arranges the keypad blocks according to the direction of the keypad calling command or the location to which the user's input is applied.

The controller 150 arranges a reference row of keypad blocks according to the location where a touch release input is applied and then the remaining rows according to the direction of the drag gesture that is input. Exemplary methods for arranging keypad blocks according to a keypad calling command are described below referring to the accompanying drawings.

The controller 150 receives a user's input, determines whether the input is a keypad adjusting command for adjusting a keypad that is displayed, and alters and displays the displayed keypad blocks. For example, if the controller 150 detects a tilt of the mobile device 100 that displays a keypad, the controller 150 moves the keypad blocks in the tilted direction and displays the keypad blocks on the screen. If the controller 150 detects a keypad movement command when the mobile device 100 displays a keypad, the controller 150 moves the keypad blocks according to the direction of a drag gesture and displays the keypad blocks on the screen.

In addition, if the controller 150 detects a keypad scaling-down/up command when the mobile device 100 displays a keypad, the controller 150 scales the keypad blocks down/up and displays the keypad blocks on the screen. Exemplary methods for varying the keypad that is displayed are described below referring to the accompanying drawings.

FIGS. 2A to 2D illustrate screens describing a type of interface for displaying keypads according to an exemplary embodiment of the present invention.

Referring to FIGS. 2A and 2B, if the controller 150 receives three drag gestures of the fingers that input to the input unit 120 when the lengthwise direction of the fingers are parallel to the edge of the touch screen, for example, the lengthwise of the touch screen, the controller 150 configures a numeric keypad and arranges the numeric keypad blocks in such a way that the reference row is set in a location where the touches are removed and the remaining rows are arranged in the direction of the drag gestures as shown in FIG. 2C. The reference row may be formed with numeric key blocks 1, 2, and 3, as shown in FIG. 2C. Alternatively, the reference row may also be formed with numeric key blocks 4, 5, and 6, as shown in FIG. 2D. While two keypad blocks are shown in FIGS. 2A-2D, it would be understood that three or more keypad blocks may be arranged in a similar fashion.

FIGS. 3A to 3C illustrate screens describing another type of interface for displaying keypads according to an exemplary embodiment of the present invention.

As shown in FIGS. 3A and 3B, if the controller 150 receives drag gestures of the fingers input to the input unit 120 when the lengthwise direction of the fingers are angled at a certain angle with respect to the edge of the touch screen, for example, the lengthwise of the touch screen, the controller 150 configures a numeric keypad and arranges the numeric keypad blocks in such a way that the reference row is set in a location where the touches are removed and the remaining rows are arranged in the direction of the drag gestures as shown in FIG. 3C.

Figure 4:
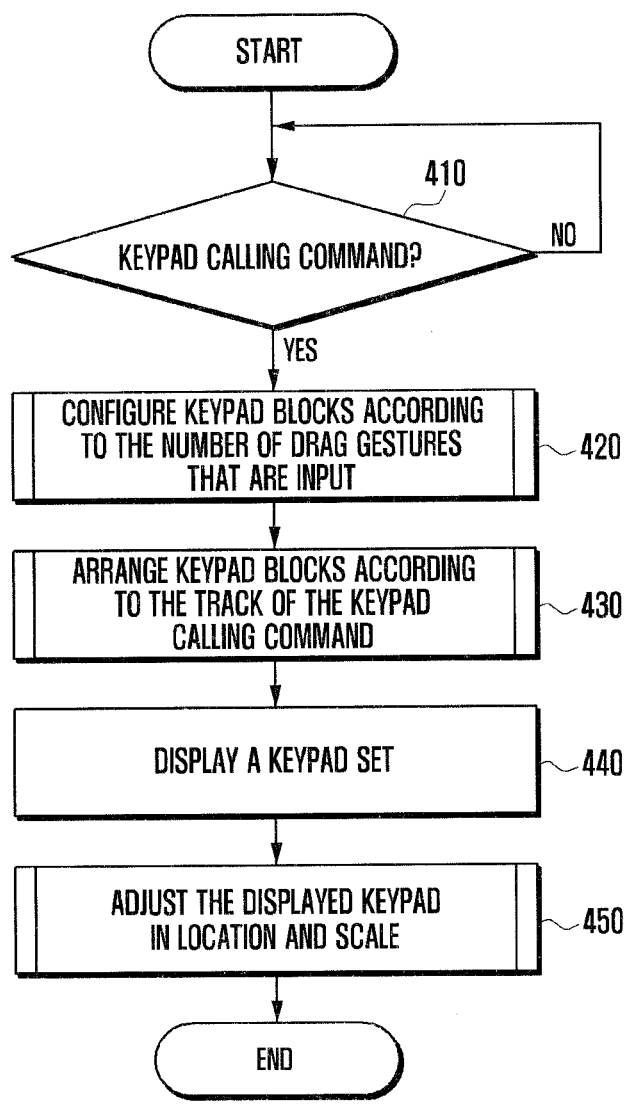
FIG. 4 illustrates a flow chart describing a method for controlling and displaying a keypad according to an exemplary embodiment of the present invention.

FIG. 4 illustrates a flow chart describing a method for controlling and displaying a keypad according to an exemplary embodiment of the present invention.

Referring to FIG. 4, the controller 150 determines whether a user's gesture input to the input unit 120 is a keypad calling command in step 410. The keypad calling command may be preset. For example, the keypad calling command can be set as an operation of inputting and releasing one or more drag gestures. It should be understood that the keypad calling command is not limited to the drag gestures. The keypad calling command may be set as a number of taps, an input created by an additional button, an input created by shaking the mobile device 100, etc. Alternatively, the keypad calling command may be set by the user.

Examples of the keypad calling command are shown in FIGS. 5A to 5D and FIGS. 6A to 6D.

FIGS. 5A to 5D illustrate screens describing a method for executing a keypad calling command of three drag gestures, according to an exemplary embodiment of the present invention.

Referring to FIGS. 5A-5D, when the user inputs three drag gestures at the bottom of the screen and moves them to the top as shown in FIGS. 5A and 5B, the controller 150 receives the coordinates of the drag gestures in the movement direction.

The user removes the touches from the top of the screen as shown in FIG. 5C, and then repeats the touch and removal operations toward the bottom of the screen. The controller 150 arranges the keypad in such a way that the keypad blocks are displayed at locations where the touches are removed in the drag direction, as shown in FIG. 5D.

FIGS. 6A to 6D illustrate screens describing a method for executing a keypad calling command of three drag gestures, according to an exemplary embodiment of the present invention.

Figure 6D:
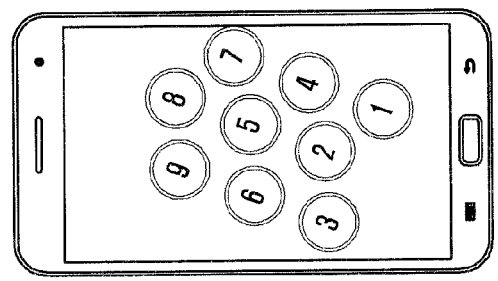
FIGS. 6A to 6D illustrate screens describing a method for executing a keypad calling command according to an exemplary embodiment of the present invention.
Figure 6C:
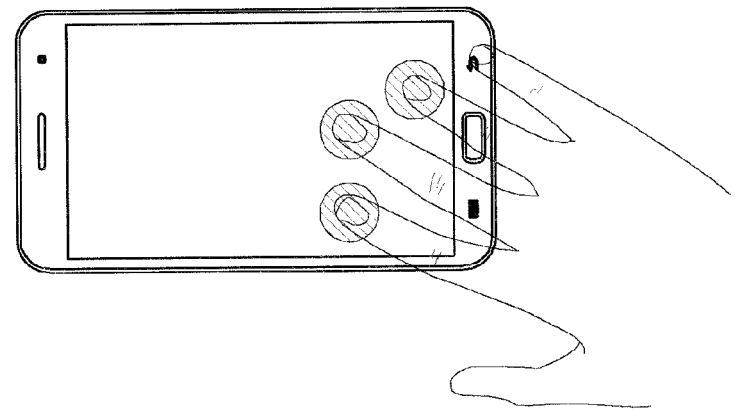
Figure 6B:
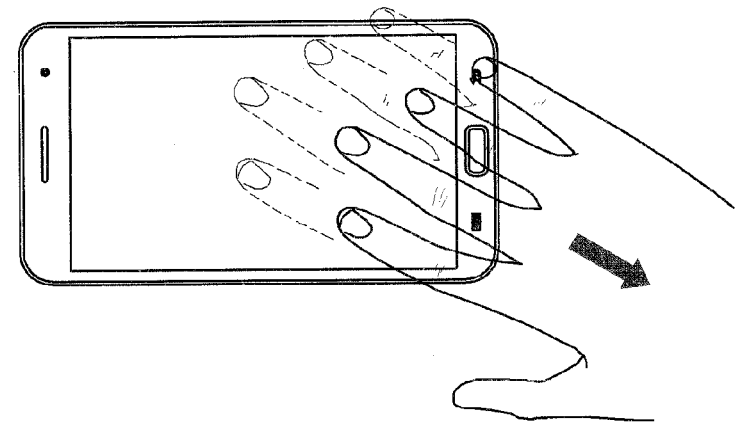
Figure 6A:
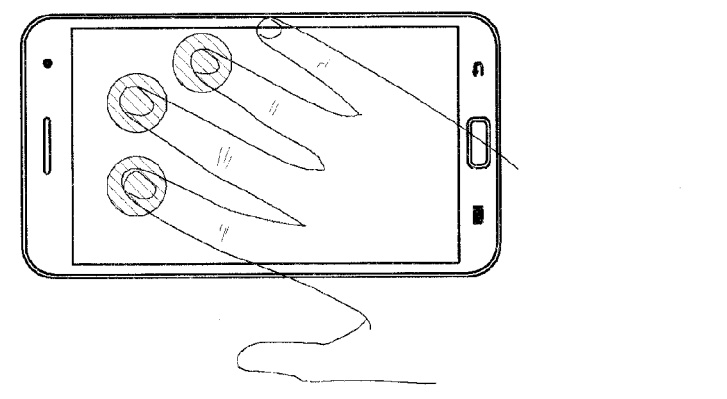

Referring to FIGS. 6A-6D, the drag gestures are executed in the direction opposite to that of the exemplary embodiment shown in FIGS. 5A to 5D. When the user inputs three drag gestures at the top of the screen and moves the drag gestures toward the bottom of the screen as shown in FIGS. 6A and 6B, the controller 150 receives the coordinates of the drag gestures in the movement direction.

The user removes the touches from the bottom of the screen as shown in FIG. 6C, and then repeats the touch and removal operations toward the top of the screen. The controller 150 arranges the keypad in such a way that the keypad blocks are displayed at locations where the touches are removed in the drag direction, as shown in FIG. 6D, which are opposite to the arrangement of the keypad blocks shown in FIG. 5D.

Referring back to FIG. 4, the controller 150 configures keypad blocks according to the number of drag gestures that are input in step 420. Step 420 is described below referring to FIG. 7 and FIGS. 8A to 11C.

Figure 7:
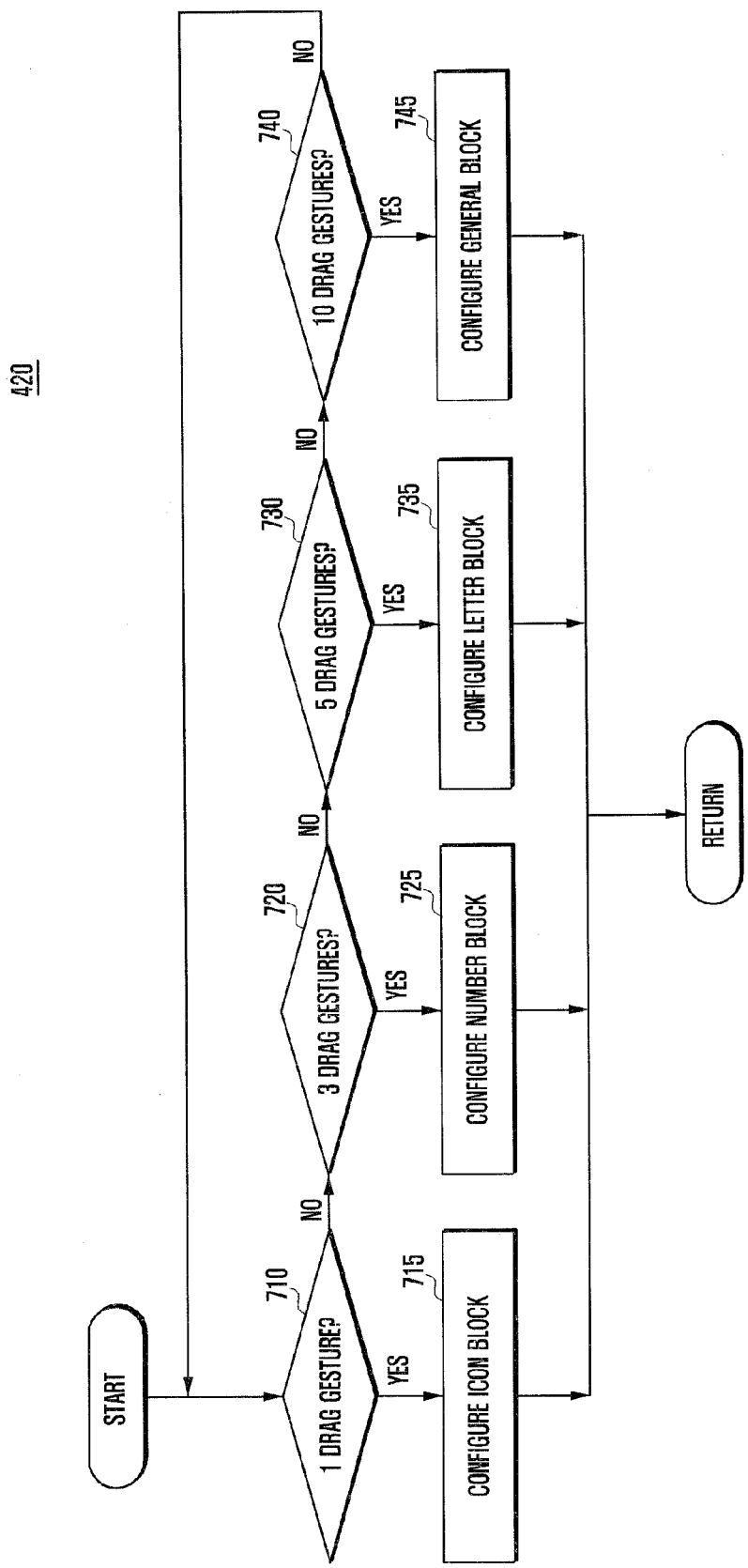
FIG. 7 illustrates a detailed flow chart describing an operation where keypad blocks are configured according to a number of drag gestures that are input according to an exemplary embodiment of the present invention.

FIG. 7 illustrates a detailed flow chart describing an operation where keypad blocks are configured according to the number of drag gestures that are input according to an exemplary embodiment of the present invention. The flow chart shown in FIG. 7 may correspond to step 420 of FIG. 4.

Referring to FIG. 7, when the controller 150 detects one drag gesture that has occurred on the screen in step 710, the controller 150 configures icon keypad blocks in step 715. If the controller 150 detects three drag gestures that have occurred on the screen in step 720, the controller 150 configures numeric keypad blocks in step 725. If the controller 150 detects five drag gestures that have occurred on the screen in step 730, the controller 150 configures letter keypad blocks in step 735. If the controller 150 detects ten drag gestures that have occurred on the screen in step 740, the controller 150 configures general keypad blocks in step 745.

FIGS. 8A to 8C illustrate screens describing a method for displaying an icon keypad according to an exemplary embodiment of the present invention.

The mobile device 100 plays back a multimedia file as shown in FIG. 8A. If the user inputs one drag gesture to the screen as shown in FIG. 8B, the controller 150 displays a keypad with icon keypad blocks related to the playback of multimedia as shown in FIG. 8C.

Figure 9C:
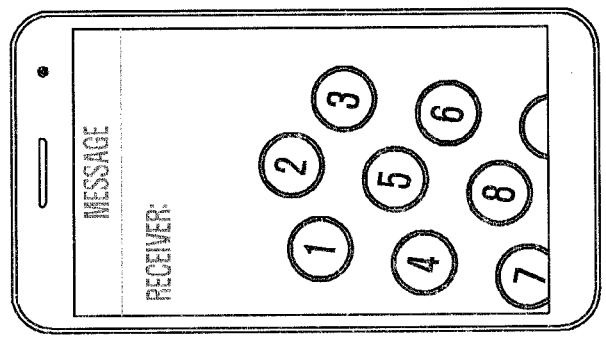
FIGS. 9A to 9C illustrate screens describing a method for displaying a numeric keypad according to an exemplary embodiment of the present invention.
Figure 9B:
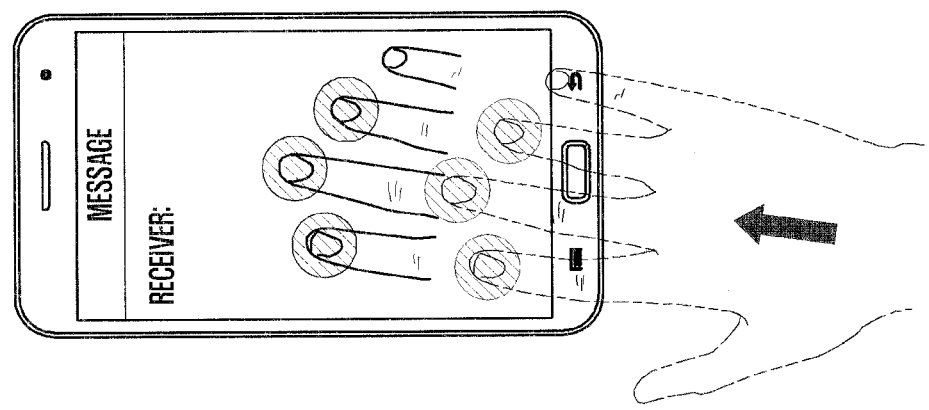
Figure 9A:
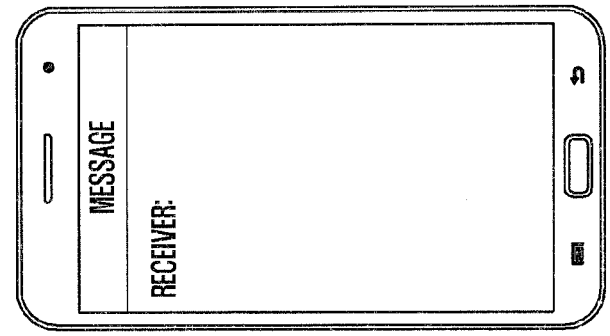

FIGS. 9A to 9C illustrate screens describing a method for displaying a numeric keypad according to an exemplary embodiment of the present invention.

The mobile device 100 operates in a standby mode to transmit a text message as shown in FIG. 9A. If the user inputs three drag gestures to the screen as shown in FIG. 9B, the controller 150 configures and displays a numeric keypad of keypad blocks as shown in FIG. 9C. The exemplary embodiments shown in FIGS. 8A to 8C and FIGS. 9A to 9C are implemented in smart phones or PDAs that have a smaller display than the user's hand. However, it should be understood that the present invention is not limited to the exemplary embodiments, and may be implemented in devices having larger displays, such as a tablet or laptop.

Figure 10A:
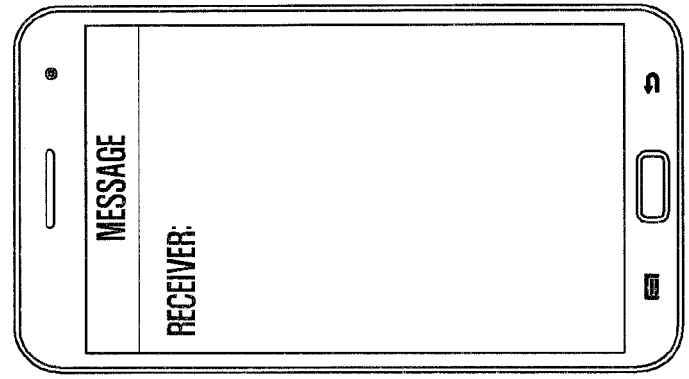
FIGS. 10A to 10C illustrate screens describing a method for displaying a letter keypad according to an exemplary embodiment of the present invention.
Figure 10B:
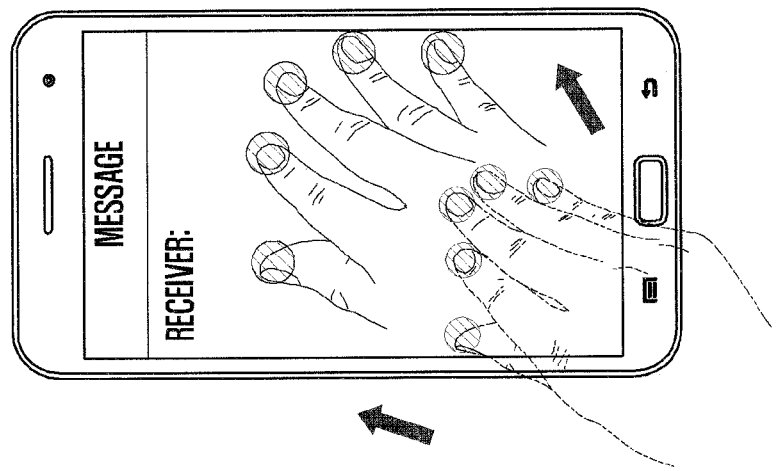
Figure 10C:
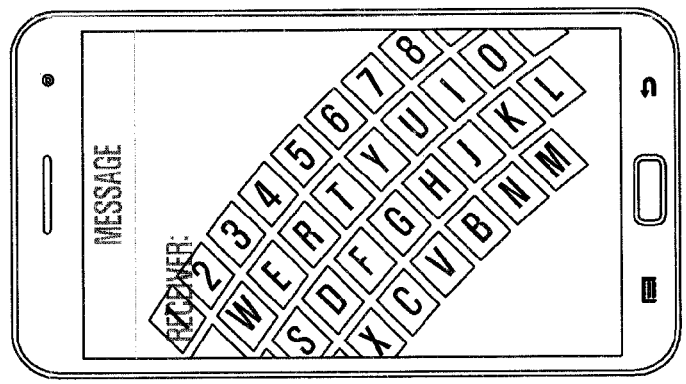

FIGS. 10A to 10C illustrate screens describing a method for displaying a letter keypad according to an exemplary embodiment of the present invention.

The mobile device 100 operates in a standby mode to transmit a text message as shown in FIG. 10A. If the user inputs five drag gestures to the screen as shown in FIG. 10B, the controller 150 configures and displays a keypad of number and letter keypad blocks as shown in FIG. 10C. The exemplary embodiment shown in FIGS. 10A to 10C is implemented in tablet PCs that have a larger display than the user's one hand. However, it should be understood that the present invention is not limited to the exemplary embodiment and may be implemented in smaller displays as well.

Figure 11A:
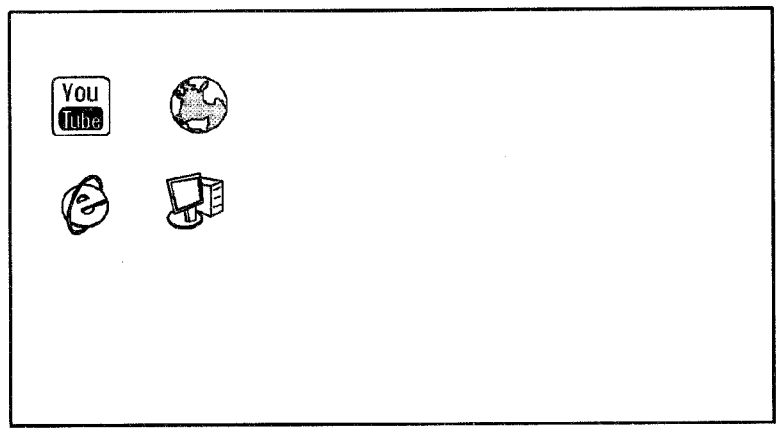
FIGS. 11A to 11C illustrate screens describing a method for displaying a general keypad including special function blocks according to an exemplary embodiment of the present invention.
Figure 11B:
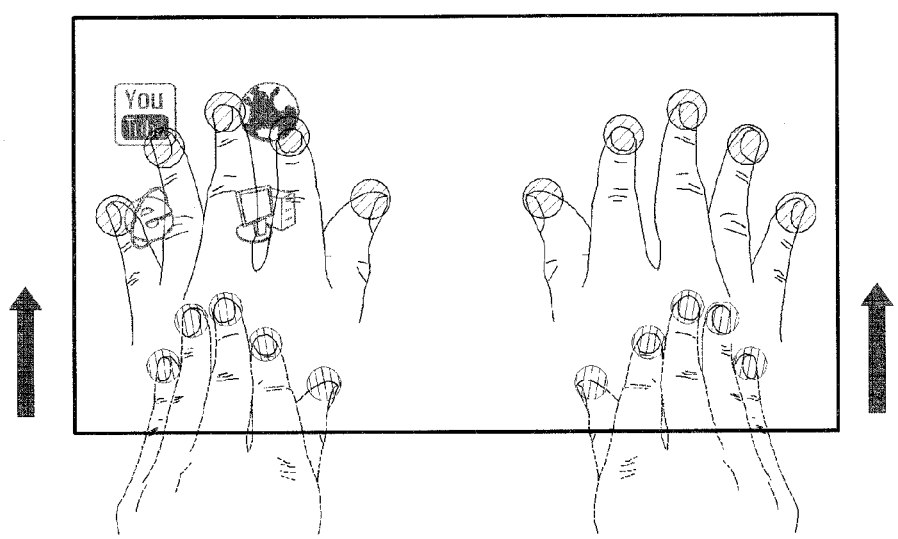
Figure 11C:
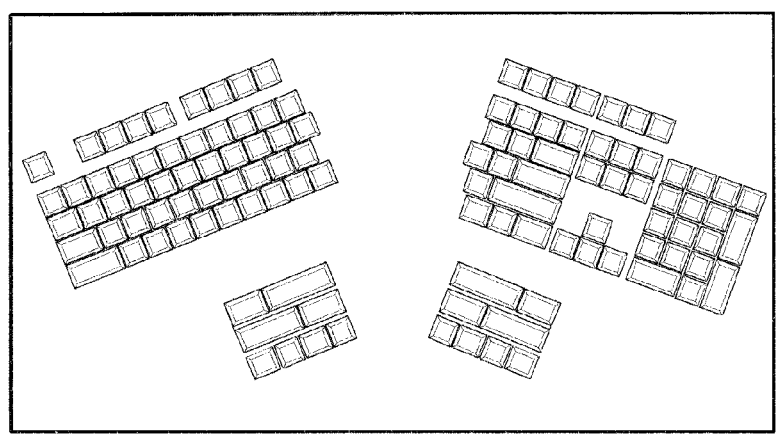

FIGS. 11A to 11C illustrate screens describing a method for displaying a general keypad including special function blocks according to an exemplary embodiment of the present invention.

The mobile device 100 operates in idle mode as shown in FIG. 11A. If the user inputs 10 drag gestures (i.e., a drag gesture including both hands) to the screen as shown in FIG. 11B, the controller 150 configures and displays a keypad of numeric keypad blocks, letter keypad blocks, and special function keypad blocks such as an insert key, a home key, a shift key, and the like as shown in FIG. 11C. The exemplary embodiment shown in FIGS. 11A to 11C is implemented in smart TVs that have a larger display than the user's two hands. However, it should be understood that the present invention is not limited to the exemplary embodiment, and may be implemented in other types of displays large enough to receive a drag gesture involving both hands.

Referring back to FIG. 4, after configuring a type of keypad with keypad blocks according to the number of drag gestures at step 420, the controller 150 determines the arrangement of the keypad blocks in step 430. The arrangement is set according to the direction and location of drag gestures corresponding to a keypad calling command, which is described below referring to FIG. 12 and FIGS. 13A to 13D.

Figure 12:
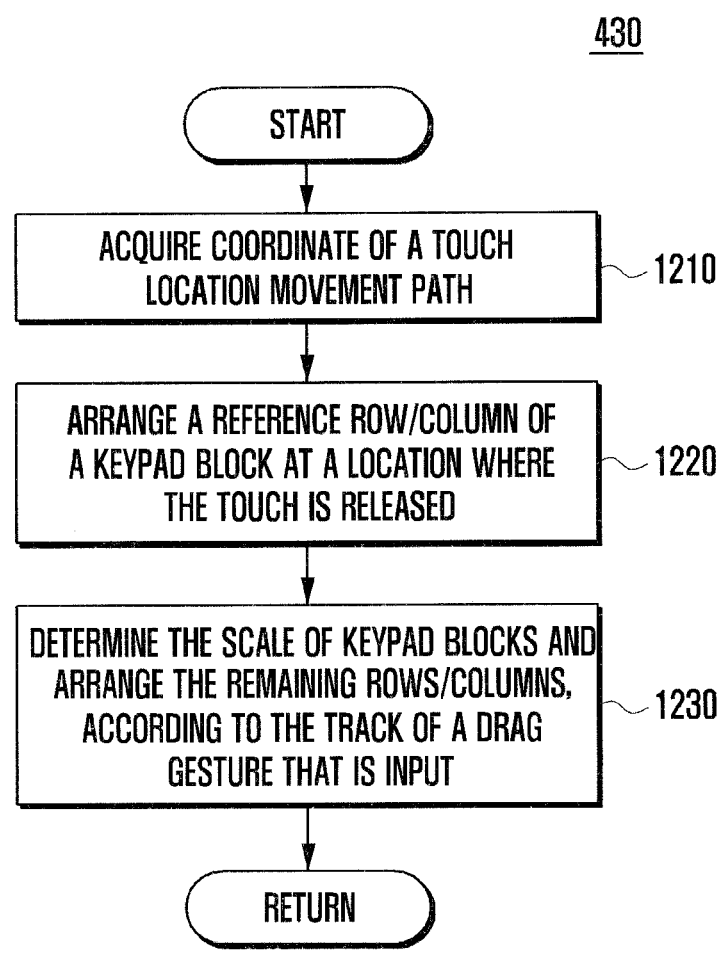
FIG. 12 illustrates a detailed flow chart describing an operation where keypad blocks are arranged according to a track of a keypad calling command according to an exemplary embodiment of the present invention.

FIG. 12 illustrates a detailed flow chart describing an operation where keypad blocks are arranged according to the track of a keypad calling command, e.g., the direction of drag gestures that are input and the location where the touches are released, according to an exemplary embodiment of the present invention. The flow chart shown in FIG. 12 may correspond to step 430 of FIG. 4.

Referring to FIG. 12, the controller 150 acquires coordinates of movement paths of touches corresponding to a keypad calling command received via the input unit 120 in step 1210. The controller 150 arranges the reference row/column of keypad blocks in locations where the touches are released in step 1220. After that, the controller 150 determines the scale of keypad blocks and arranges the remaining rows/columns of keypad blocks, according to the track of the input drag gestures in step 1230.

For example, if the drag gestures are input, spaced relatively far apart from each other, the controller 150 sets the scale of keypad blocks to be relatively wide in the left and right direction. Likewise, if the drag gestures are input, spaced relatively close to each other, the controller 150 sets the scale of keypad blocks to be relatively narrow in the left and right direction. According to an exemplary embodiment of the present invention, the controller 150 may arrange the remaining rows/columns of keypad blocks, other than the reference row/column set at step 1220, in the input direction of drag gestures.

FIGS. 13A to 13D illustrate screens describing a method for arranging keypad blocks according to an exemplary embodiment of the present invention.

Figure 13D:
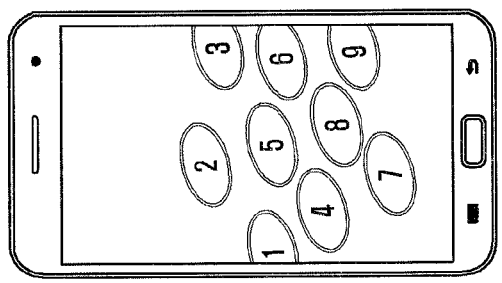
FIGS. 13A to 13D illustrate screens describing a method for arranging keypad blocks according to an exemplary embodiment of the present invention.
Figure 13C:
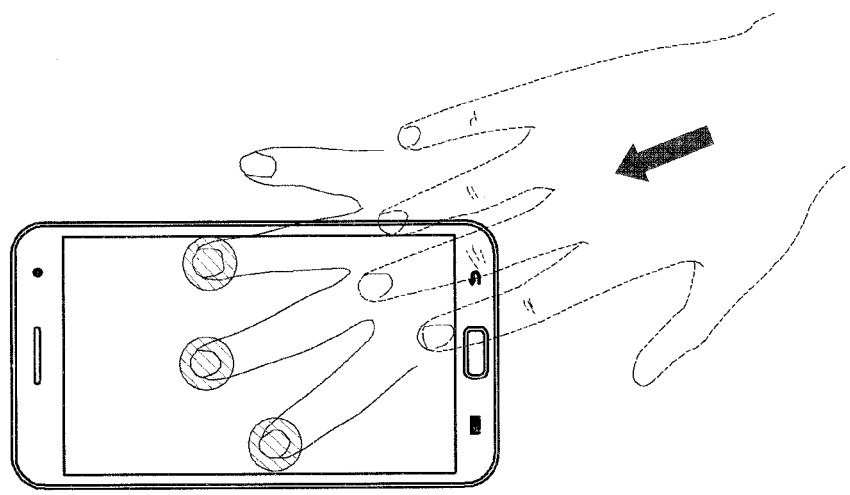
Figure 13B:
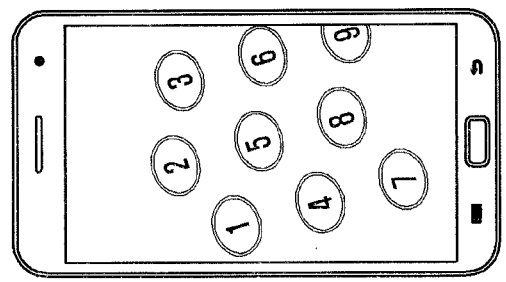
Figure 13A:
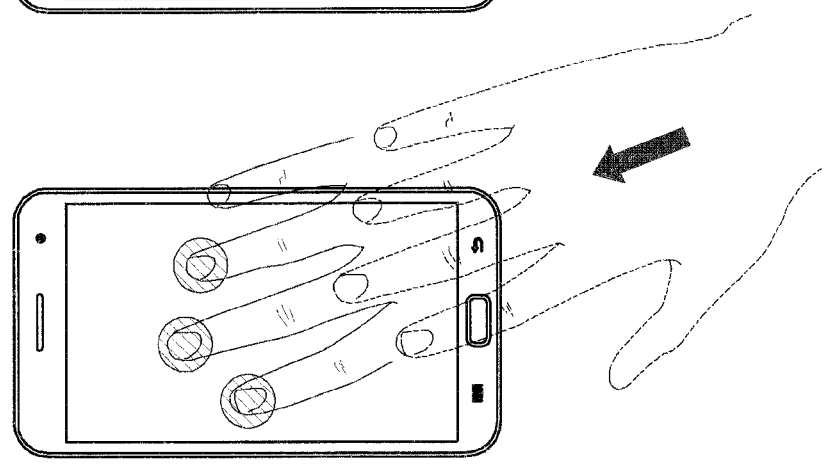

Referring to FIGS. 13A-13D, the touches for a keypad calling command as shown in FIG. 13A are released from a higher location of the screen, with respect to the lengthwise direction, than those as shown in FIG. 13C. In addition, the touches for a keypad calling command as shown in FIG. 13A are input to the screen, spaced closer to each other with respect to the widthwise direction, than those as shown in FIG. 13C. The user's fingers creating the touches as shown in FIG. 13C are spaced farther apart than those shown in FIG. 13A.

As shown in FIGS. 13A and 13C, keypad blocks of a keypad may be arranged differently in types according to the locations where the touches for keypad calling commands are released from the screen. The first row of keypad blocks as shown in FIG. 13B, created when a keypad calling command is executed as shown in FIG. 13A, is higher on the screen with respect to the lengthwise direction, than that as shown in FIG. 13D, created when a keypad calling command is executed as shown in FIG. 13C.

In addition, the remaining keypad blocks of the keypad may also be arranged differently according to the tracks of the drag gestures for the keypad calling commands respectively. The intervals between keypad blocks shown in FIG. 13D are wider than those as shown in FIG. 13A. In addition, the width of the keypad of keypad blocks shown in FIG. 13D is also greater than that shown in FIG. 13B.

Referring back to FIG. 4, after determining the arrangement of the keypad blocks at step 430, the controller 150 displays the determined keypad of keypad blocks in step 440.

The controller 150 adjusts the location and scale of the displayed keypad blocks, according to a user's keypad adjusting command in step 450. A method for adjusting the displayed keypad is described below referring to FIG. 14. A method for moving the displayed keypad is described below referring to FIGS. 15A to 15F. A method for adjusting the displayed keypad in scale is described below referring to FIGS. 16A to 16C.

Figure 14:
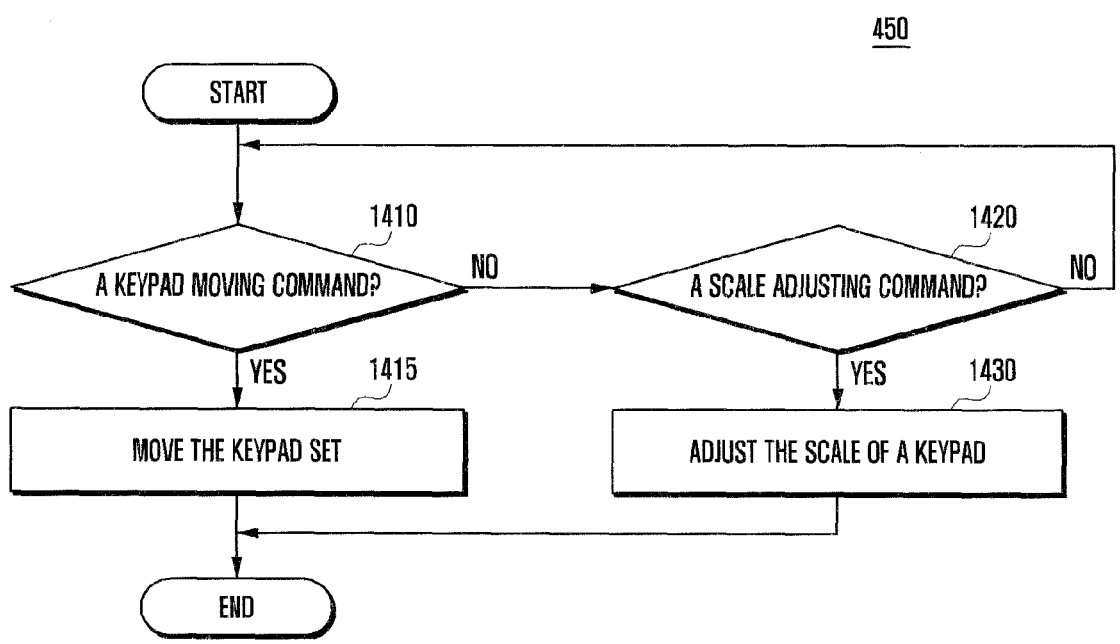
FIG. 14 illustrates a detailed flow chart describing an operation where a displayed keypad is adjusted according to an exemplary embodiment of the present invention.

FIG. 14 illustrates a detailed flow chart an operation where the displayed keypad is adjusted according to an exemplary embodiment of the present invention. The operation shown in FIG. 14 may correspond to step 450 of FIG. 4.

Referring to FIG. 14, the controller 150 determines whether a user's input of the input unit 120 is a keypad adjusting command when the keypad is displayed on the screen in steps 1410 and 1420. If the controller 150 determines that the user's input is a keypad movement command at step 1410, the controller 150 moves and displays the keypad in step 1415.

If the controller 150 determines that the user's input is a keypad sale adjusting command at step 1420, the controller 150 scales the keypad up/down in step 1430.

FIGS. 15A to 15F illustrate screens describing a method for moving a keypad that is displayed according to an exemplary embodiment of the present invention.

Referring to FIGS. 15A-15F, if not all of the numeric keypad blocks are displayed on the screen as shown in FIG. 15A, the user applies a touch action to a certain location of the displayed keypad on the screen for a certain period of time and then drags the displayed keypad toward the top of the screen, as shown in FIG. 15B. In that case, the numeric keypad blocks are moved to the top according to the drag gesture and displayed as shown in FIG. 15C.

If the input unit 120 receives a touch action that is applied to a certain location of the displayed keypad on the screen for a certain period of time and the drag toward the top of the screen as shown in FIG. 15B, the controller 150 detects the actions as a keypad movement command. In that case, the controller 150 moves the keypad toward the top of the screen according to the drag gesture and displays the keypad as shown in FIG. 15C.

In addition, if part of the letter keypad is not displayed on the screen as shown in FIG. 15D, the user tilts the mobile device 100 as shown in FIG. 15E to move the keypad blocks, thereby displaying the keypad blocks as shown in FIG. 15F.

If the rotation detector 170 detects a tilt of the mobile device 100 while the mobile device 100 displays the letter keypad on the screen as shown in FIG. 15E, the controller 150 detects the detected tilting operation as a keypad movement command. The controller 150 moves the keypad on the screen in the tilted direction and displays the keypad as shown in FIG. 15F.

FIGS. 16A to 16C illustrate screens describing a method for adjusting the scale of a keypad that is displayed according to an exemplary embodiment of the present invention.

If part of the letter keypad is not displayed on the screen as shown in FIG. 16A, the user applies two touches to corresponding locations of the displayed keypad on the screen and then performs a pinching action as shown in FIG. 16B, thereby adjusting the scale of keypad blocks and displaying the keypad blocks as shown in FIG. 16C.

If the input unit 120 simultaneously receives two touches at corresponding locations of the displayed keypad on the screen, being dragged closer together in a pinching action as shown in FIG. 16B, the controller 150 detects the actions as a command for scaling down the keypad, and scales down and displays the keypad as shown in FIG. 16C.

Although not shown in the drawing, if the input unit 120 simultaneously receives two touches at corresponding locations of the displayed keypad on the screen, being moved apart, the controller 150 detects the actions as a command for scaling up the keypad. The controller 150 accordingly scales the displayed keypad up and displays the keypad according to the new scale.

FIGS. 17A to 17D illustrate screens describing a method for using a keypad display interface by the visually impaired people, according to an exemplary embodiment of the present invention.

Referring to FIGS. 17A-17D, since the system and method according to exemplary embodiments of the present invention displays keypad blocks not at fixed locations but at locations according to the tracks of a user's input keypad calling command, the system and method can allow users to easily recognize keypads without visual information. Therefore, the system and method can be applied to keypad display interface of mobile devices for the visually impaired people.

When numeric keypad blocks are displayed on the screen as shown in FIG. 17A, the user clicks numeric key blocks, 1, 2, and 4, as shown in FIG. 17B. In that case, the mobile device 100 can provide voice information regarding the clicked numeric keypad blocks, 1, 2, and 4. If the user needs to correct one of the numbers, e.g., 2 to 5, the user clicks the keypad blocks 2 and 5, thereby correcting to 5. After completing the input operation, the user makes a gesture as shown in FIG. 17D and then can execute other operations, e.g., inputting other letters.

As described above, since the system and method according to exemplary embodiments of the present invention displays a keypad including various types of blocks according to the number of drag gestures for a keypad calling command, it can increase the intuitiveness of the user interface for displaying the keypad.

Since the system and method according to exemplary embodiments of the present invention arranges keypad blocks according to the track of a keypad calling command, it can provide an ergonomic keypad considering a user's preferences and conditions.

The system and method according to exemplary embodiments of the present invention allows users to easily adjust a keypad on a touch screen, in location and scale, via intuitive operations, e.g., tilting the mobile device, instead of menus. Therefore, users can intuitively recognize the keypad usage.

It will be appreciated that exemplary embodiments of the present invention according to the claims and description in the specification can be realized in the form of hardware, software or a combination of hardware and software.

Any such software may be stored in a non-transitory computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are exemplary embodiments of non-transitory machine-readable storage that are suitable for storing a program or programs comprising instructions that, when executed, implement exemplary embodiments of the present invention. Accordingly, exemplary embodiments provide a program comprising code for implementing apparatus or a method as claimed in any one of the claims of this specification and a machine-readable storage storing such a program.

While the invention has been described with reference to certain exemplary embodiments thereof, it will be understood by those skilled in the art that various changes in form and details may be made therein without departing from the spirit and scope of the invention as defined in the appended claims and their equivalents.

What is claimed is:

1. A method for displaying a keypad on a mobile device, the method comprising:
   receiving one or more gestures for a keypad calling command; and
   displaying one or more keypad blocks on the screen of the mobile device based on a track of one or more drag gestures that are input and a location where the one or more drag gestures are released,
   wherein the orientation of the displayed keypad blocks depends upon the track of the one or more drag gestures.

2. The method of claim 1, wherein the one or more drag gestures for the keypad calling command comprises one or more drag gestures that are input and one or more drag release gestures after the drag gestures; and
   wherein the displaying of the keypad blocks comprises displaying a reference row of keypad blocks in locations where the one or more drag gestures are released.

3. The method of claim 2, wherein the displaying of the keypad blocks comprises:
   displaying the remaining rows of keypad blocks according to the track of the drag gestures.

4. The method of claim 3, wherein the displaying of the keypad blocks comprises:
   displaying the keypad blocks including at least one of icons, numbers, letters, and special functions, according to the number of drag gestures that are input.

5. The method of claim 4, wherein the displaying of the keypad blocks comprises:
   displaying the keypad blocks including icons if the number of drag gestures that are input is one.

6. The method of claim 5, wherein the displaying of the keypad blocks comprises:
   displaying the keypad blocks including numbers if the number of drag gestures that are input is three.

7. The method of claim 6, wherein the displaying of the keypad blocks comprises:
   displaying the keypad blocks including letters if the number of drag gestures that are input is five.

8. The method of claim 7, wherein the displaying of the keypad blocks comprises:
   displaying the keypad blocks including special functions if the number of drag gestures that are input is ten.

9. The method of claim 8, further comprising:
   receiving a keypad adjusting command; and
   altering and displaying the displayed keypad blocks according to the keypad adjusting command.

10. The method of claim 9, wherein the keypad adjusting command comprises a gesture for tilting the mobile device that displays the keypad blocks; and
    wherein the altering and displaying of the displayed keypad blocks comprises moving and displaying the displayed keypad blocks while the mobile device is tilted.

11. The method of claim 10, wherein the keypad adjusting command comprises a gesture for applying a touch to the displayed keypad blocks on the screen for a certain period of time and dragging the displayed keypad blocks; and
    wherein the altering and displaying of the displayed keypad blocks comprises moving the displayed keypad blocks according to the direction of the drag gesture and displaying the displayed keypad blocks according to the motion.

12. The method of claim 11, wherein the keypad adjusting command comprises a gesture for applying one or more touches to the displayed keypad blocks on the screen and dragging the displayed keypad blocks; and
    wherein the altering and displaying of the displayed keypad blocks comprises scaling the displayed keypad blocks down or up according to the direction of the drag gestures and displaying the keypad blocks according to the scaling.

13. A non-transitory computer-readable storage medium storing instructions that, when executed, cause at least one processor to perform the method of claim 1.

14. A system for displaying a keypad on a mobile device, the system comprising:
    an input unit for receiving one or more drag gestures; and
    a controller for determining whether the one or more drag gestures are a keypad calling command, and for displaying one or more keypad blocks on the screen based on a track of the more or more drag gestures that are input and a location where the one or more drag gestures are released,
    wherein the orientation of the displayed keypad blocks depends upon the track of the one or more drag gestures.

15. The system of claim 14, wherein the one or more drag gestures for the keypad calling command comprises one or more drag gestures that are input and one or more drag release gestures after the drag gestures; and
    wherein the controller displays a reference row of keypad blocks in locations where the one or more drag gestures are released.

16. The system of claim 15, wherein the controller displays the remaining rows of keypad blocks according to the track of the drag gestures.

17. The system of claim 16, wherein the controller displays the keypad blocks including at least one of icons, numbers, letters, and special functions, according to the number of drag gestures that are input.

18. The system of claim 17, wherein the controller displays the keypad blocks including icons if the number of drag gestures that are input is one.

19. The system of claim 18, wherein the controller displays the keypad blocks including numbers if the number of drag gestures that are input is three.

20. The system of claim 19, wherein the controller displays the keypad blocks including letters if the number of drag gestures that are input is five.

21. The system of claim 20, wherein the controller displays the keypad blocks including special functions if the number of drag gestures that are input is ten.

22. The system of claim 21, wherein the controller determines whether the user's input is a keypad adjusting command and alters and displays the displayed keypad blocks according to the keypad adjusting command.

23. The system of claim 22, wherein the controller detects a tilt of the mobile device that displays the keypad blocks, and moves and displays the displayed keypad blocks according to the tilt.

24. The system of claim 23, wherein the keypad adjusting command comprises a gesture for applying a touch to the displayed keypad blocks on the screen for a certain period of time and dragging the keypad blocks according to the gesture; and wherein the controller moves and displays the displayed keypad blocks according to the direction of the drag gesture and displays the displayed keypad blocks according to the motion.

25. The system of claim 24, wherein the keypad adjusting command comprises a gesture for applying one or more touches to the displayed keypad blocks on the screen and dragging the displayed keypad blocks; and the controller scales the displayed keypad blocks down or up according to the direction of the drag gestures and displays the displayed keypad blocks according to the scaling.

* * * * *